(12) United States Patent
Ogoshi et al.

(10) Patent No.: US 10,093,346 B2
(45) Date of Patent: Oct. 9, 2018

(54) MOTOR CONTROLLER AND ELECTRIC POWER STEERING DEVICE

(71) Applicant: DENSO CORPORATION, Kariya, Aichi-pref. (JP)

(72) Inventors: Junichi Ogoshi, Kariya (JP); Yuta Uozaki, Kariya (JP); Rei Muramatsu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 339 days.

(21) Appl. No.: 15/097,688

(22) Filed: Apr. 13, 2016

(65) Prior Publication Data

US 2016/0308483 A1 Oct. 20, 2016

(30) Foreign Application Priority Data

Apr. 17, 2015 (JP) .................................. 2015-84852

(51) Int. Cl.
| | |
|---|---|
| *H02P 6/00* | (2016.01) |
| *B62D 5/04* | (2006.01) |
| *H02P 7/03* | (2016.01) |
| *H02P 7/29* | (2016.01) |
| *H02P 29/024* | (2016.01) |

(52) U.S. Cl.
CPC ................ *B62D 5/046* (2013.01); *H02P 7/04* (2016.02); *H02P 7/29* (2013.01); *H02P 29/0241* (2016.02)

(58) Field of Classification Search
CPC ................ H02H 11/003; H05B 41/042; H05B 41/2881; H05B 41/2883; H05B 41/2886
See application file for complete search history.

(56) References Cited

U.S. PATENT DOCUMENTS

| | | | | |
|---|---|---|---|---|
| 6,055,960 | A | * 5/2000 | Marumoto | ............ F02D 11/105 123/399 |
| 2005/0088126 | A1 | * 4/2005 | Kawashima | ......... B62D 5/0487 318/434 |
| 2012/0299646 | A1 | * 11/2012 | Southcombe | ......... H03F 1/0227 330/127 |

FOREIGN PATENT DOCUMENTS

| | | |
|---|---|---|
| JP | 2007-276586 A | 10/2007 |
| JP | 2007-295753 A | 11/2007 |

* cited by examiner

*Primary Examiner* — Zoheb Imtiaz
(74) *Attorney, Agent, or Firm* — Knobbe, Martens, Olson & Bear, LLP

(57) ABSTRACT

A motor controller includes an H-bridge circuit, a switching-element driving circuit, a motor-current detection circuit, a sample hold circuit executing a sample hold of an output of the motor-current detection circuit at every half period and outputting the output of the motor-current detection circuit as a first signal and a second signal, according to a PWM output timing of the switching-element driving circuit, and a motor-current calculation circuit selecting a signal that is larger between the first signal and the second signal as a selection signal, calculating a value of the selection signal as an absolute value of a motor current, determining a current direction based on a relation between the selection signal and a PWM output signal at a sample timing that the selection signal is obtained.

4 Claims, 6 Drawing Sheets

FIG. 3A
DRIVING SIGNAL OF FIRST DRIVING CIRCUIT
DRIVING SIGNAL OF SECOND DRIVING CIRCUIT
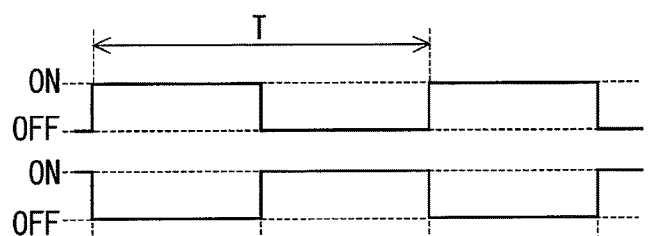
FIG. 3B
MOTOR CURRENT
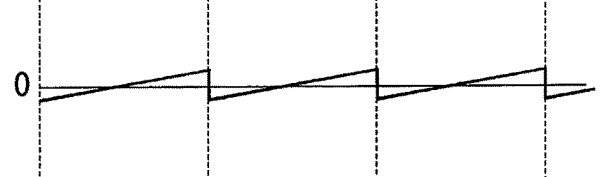
FIG. 3C
SHUNT VOLTAGE
FIG. 3D
DIFFERENTIAL AMPLIFIER OUTPUT
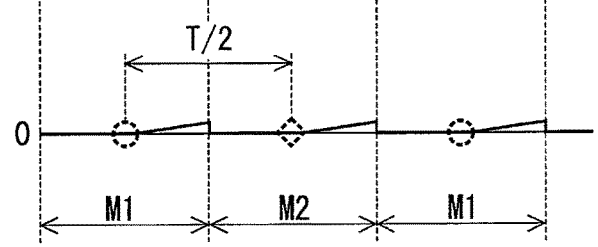

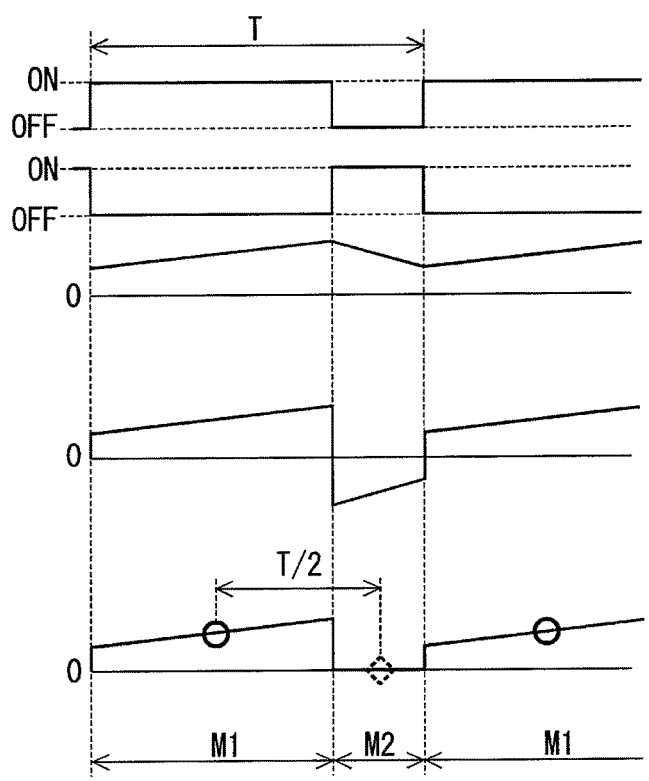

DRIVING SIGNAL OF FIRST DRIVING CIRCUIT

DRIVING SIGNAL OF SECOND DRIVING CIRCUIT

MOTOR CURRENT

SHUNT VOLTAGE

DIFFERENTIAL AMPLIFIER OUTPUT

FIG. 6A
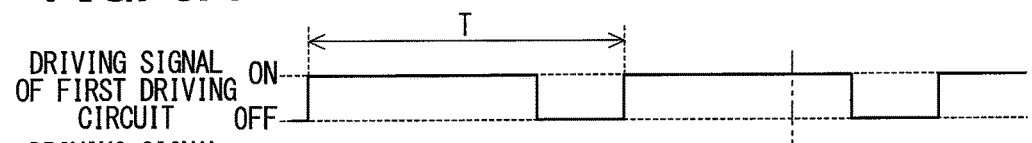
FIG. 6B
MOTOR CURRENT
FIG. 6C
SHUNT VOLTAGE
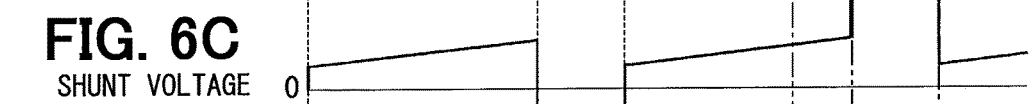
FIG. 6D
DIFFERENTIAL AMPLIFIER OUTPUT
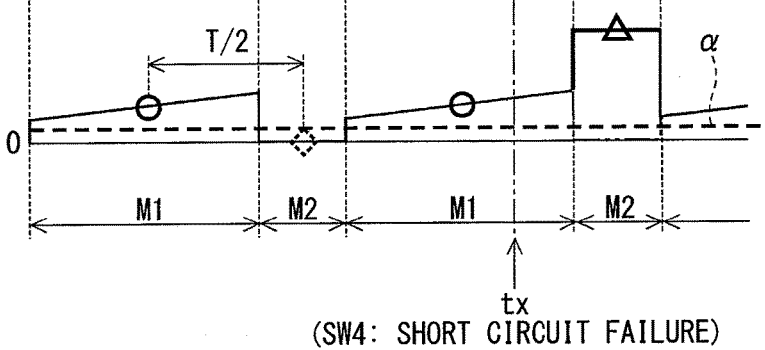
tx
(SW4: SHORT CIRCUIT FAILURE)

MOTOR CONTROLLER AND ELECTRIC POWER STEERING DEVICE

CROSS REFERENCE TO RELATED APPLICATION

This application is based on Japanese Patent Application No. 2015-84852 filed on Apr. 17, 2015, the disclosure of which is incorporated herein by reference.

TECHNICAL FIELD

The present disclosure relates to a motor controller which controls an energization of a motor and a rotation direction of the motor, and an electric power steering device including the motor controller.

BACKGROUND

Conventionally, it is well known that a motor controller controls a switch of an H-bridge circuit to control an energization of a motor and a rotation direction of the motor. Japanese Patent No. 4382768 discloses that a controller of a DC motor which is applied to an electric power steering device has a configuration to include a motor-current detection circuit detecting a voltage between two ends of a shunt resistor connected with an H-bridge circuit in series connection. The above motor controller executes a sample hold of an output of the motor-current detection circuit at every half period of an output of a switching-element driving circuit, and detects an absolute value of a current flowing through a motor and a current direction of the current based on a value obtained by subtracting one of two sampling values from the other one of the two sampling values which are obtained every half period.

SUMMARY

According to a conventional technology in Japanese Patent No. 4382768, when a duty of a PWM output signal of the switching-element driving circuit is 100% or 0%, only one sample value is obtained, and a calculation subtracting one of two sampling values from the other one of the two sampling values cannot be executed. When a motor current Im is zero in a case where the duty is 0%, a current detection value of when one sample value is Im is obtained by subtracting zero from Im, that is, the current detection value is Im. However, this value does not match the current detection value 2 Im of when the duty is not equal to 0%.

In Japanese Patent No. 4382768, since either a positive value or a negative value of the output of the motor-current detection circuit is used, it is necessary to offset an output of a differential amplifier which corresponds to a current that is zero, to a positive side. Therefore, a resolution relative to the current of a positive region is substantially reduced to a half.

In a third embodiment in Japanese Patent No. 4382768, in a period where the detection current value is negative, the output of the differential amplifier of the motor-current detection circuit is inverted to an opposite polarity through an inverting amplifier and then is outputted an input terminal of a duty rate calculation portion. Therefore, it is necessary to provide the inverting amplifier, and a circuit scale increases.

The present disclosure is made in view of the above matters, and it is an object of the present disclosure to provide a motor controller in which a current can be detected in a case where a duty of a PWM output signal is 100% or 0%, and an output of a motor-current detection circuit is unnecessary to be offset.

The present disclosure relates to a motor controller controlling an energization and a rotation direction of a DC motor that can rotate in a positive rotation direction and a negative rotation direction. The motor controller includes an H-bridge circuit, a switching-element driving circuit, a motor-current detection circuit, a sample hold circuit, and a motor-current calculation circuit.

The H-bridge circuit includes four switching elements which are connected in a bridge connection, and supplies a direct-current power to the DC motor.

The switching-element driving circuit PWM drives a first driving circuit and a second driving circuit, the first driving circuit includes the switching elements arranged on a diagonal line of the H-bridge circuit, and the second driving circuit includes the switching elements arranged on the other diagonal line of the H-bridge circuit.

The motor-current detection circuit includes a shunt resistor connected with the H-bridge circuit in a series connection, and detects a voltage between two ends of the shunt resistor.

The sample hold circuit executes a sample hold of an output of the motor-current detection circuit at every half period and outputs the output of the motor-current detection circuit obtained when the first driving circuit is turned on as a first signal and the output of the motor-current detection circuit obtained when the second driving circuit is turned on as a second signal, according to a PWM output timing of the switching-element driving circuit.

The motor-current calculation circuit selects a signal that is larger between the first signal and the second signal as a selection signal, calculates a value of the selection signal as an absolute value of a motor current, and determines a current direction based on a relation between the selection signal and a PWM output signal at a sample timing that the selection signal is obtained.

In the motor controller according to the present disclosure, regarding the PWM output signal of the switching-element driving circuit, when the on-duty of the first driving circuit is 100% and the on-duty of the second driving circuit is 0%, the first signal is detected, and the second signal is substantially not detected. In this case, the motor-current calculation circuit determines that the value of the second signal is zero, calculates the absolute value of the motor current based on the first signal as the selection signal, and can determine the current direction. Therefore, even though the duty is 100% or 0% where the current direction cannot be detected in a conventional technology in Japanese Patent No. 4382768, the motor controller according to the present disclosure can detect the current direction.

Since the motor-current calculation circuit according to the present disclosure uses zero or a positive signal between the first signal and the second signal without using a negative signal, it is unnecessary that the output of the motor-current detection circuit of when a voltage is zero is offset to a positive side. Therefore, the output with a high resolution can be obtained.

According to the present disclosure, since it is unnecessary to provide the inverting amplifier, the absolute value of the motor current and the current direction of the motor current can be detected by a simple configuration. Therefore, the present disclosure is efficient to the electric power steering device in which a limit of an attachment space is strict.

BRIEF DESCRIPTION OF THE DRAWINGS

The above and other objects, features and advantages of the present disclosure will become more apparent from the following detailed description made with reference to the accompanying drawings. In the drawings:

FIGS. 3A to 3D are time charts showing signal outputs of when an on-duty of a first driving circuit is equal to 50%;

FIGS. 4A to 4D are time charts showing the signal outputs of when the on-duty of the first driving circuit is larger than 50%;

FIGS. 6A to 6D are time charts showing the signal outputs of when a switching element SW4 of a lower arm has a short circuit failure in FIGS. 4A to 4D.

DESCRIPTION OF EMBODIMENTS

Figure 1:
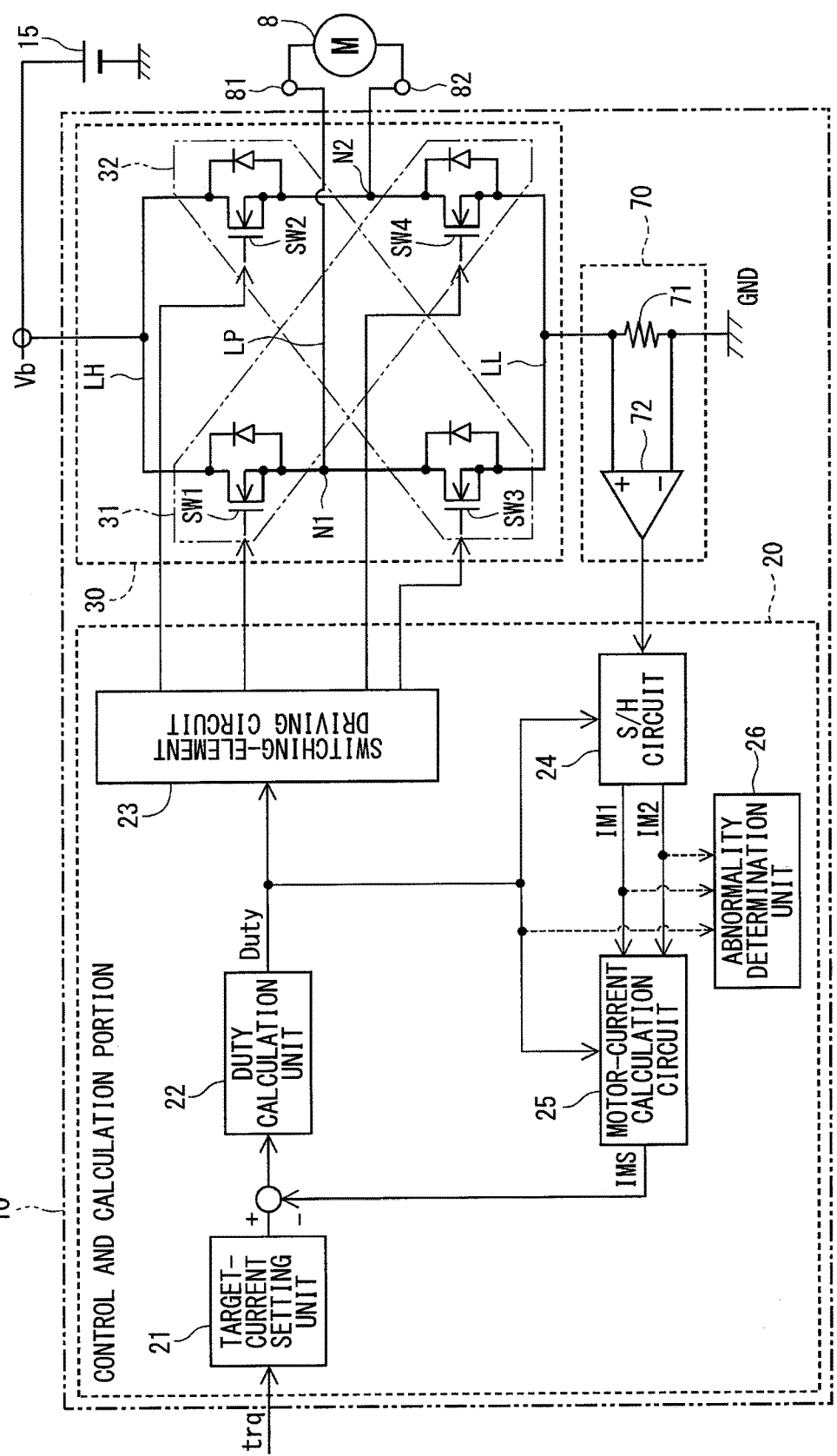
FIG. 1 is a diagram showing an outline of a motor controller according to an embodiment of the present disclosure.

Hereafter, referring to drawings, an embodiment of the present disclosure in which a motor controller is applied to an electric power steering device of a vehicle will be described.

First, referring to FIG. 2, a basic configuration of the electric power steering device will be described. The electric power steering device 90 includes a motor 8 that is a DC motor and generates an assist torque to support a steering of when a driver operates a handle 91, and the motor controller 10 that controls an energization of the motor 8 and a rotation direction of the motor 8. The motor controller 10 converts a direct-current power of a battery 15 and supplies a converted power of the direct-current power to the motor 8, based on a torque signal trq from a torque sensor 95 that is mounted to a steering shaft 92.

Figure 2:
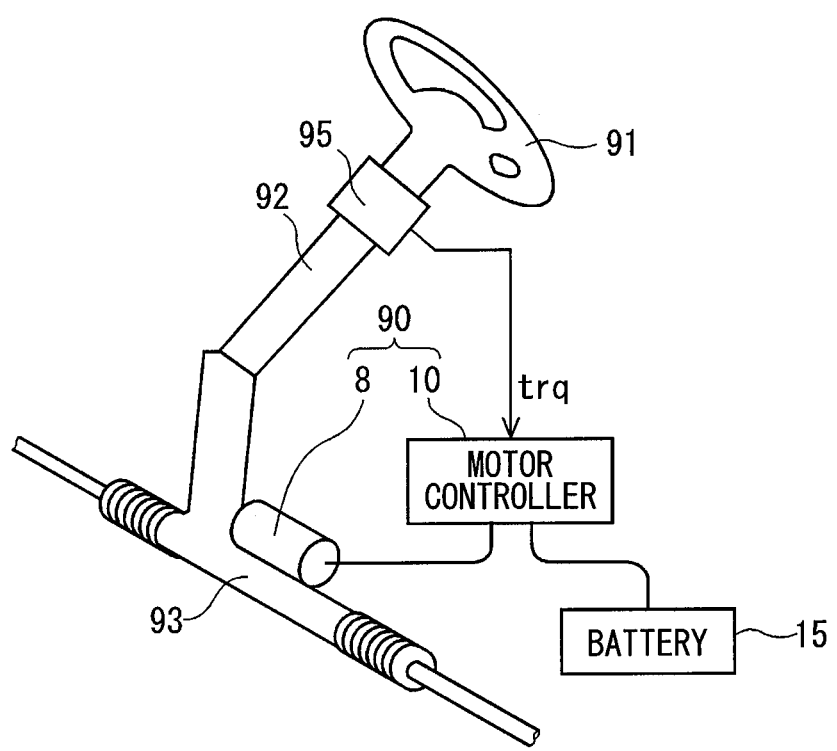
FIG. 2 is a diagram showing an electric power steering device to which the motor controller shown in FIG. 1 is applied.
Figures 5A, 5B, 5C, 5D:
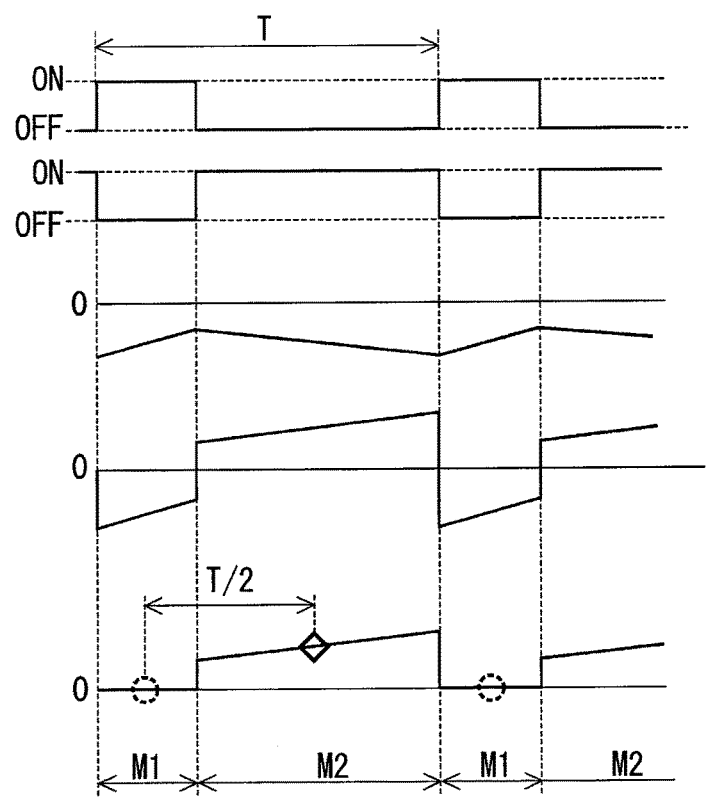
FIGS. 5A to 5D are time charts showing the signal outputs of when the on-duty of the first driving circuit is smaller than 50%.

As shown in FIG. 2, the electric power steering device 90 in which the motor 8 is mounted to a rack shaft 93 is a rack assist type. However, according to the present embodiment, the electric power steering device 90 may be a column assist type.

Next, referring to FIG. 1, a configuration of the motor controller will be described. The motor controller 10 is disposed between the battery 15 and the motor 8. The motor 8 rotates depending on a steering direction of the driver. For example, when the driver rotates the handle in a right direction, the motor 8 rotates in a positive rotation direction. When the driver rotates the handle in a left direction, the motor 8 rotates in a negative rotation direction. When the motor 8 is rotates by an external force from a road, the motor 8 operates as a power generator to generate a current in a regeneration direction.

Generally, an electric power steering device may include a rotational angle sensor that detects a rotor position of a motor, or may not include the rotational angle sensor. Since the present disclosure is applied to an electric power steering device that does not include the rotational angle sensor, the motor controller 10 cannot directly obtain an information about the rotation direction of the motor 8. Therefore, the motor controller 10 detects a direction of a current flowing through the motor 8, and then recognizes the rotation direction of the motor 8. In this case, the direction of the current is referred to as a current direction.

The motor controller 10 includes an H-bridge circuit 30, a motor-current detection circuit 70, and a control and calculation portion 20.

The H-bridge circuit 30 is constituted by four switching elements SW1, SW2, SW3, SW4 which are connected in a bridge connection between a high-voltage line LH and a low-voltage line LL. Specifically, the switching element SW1 of an upper arm and the switching element SW3 of a lower arm are connected with each other in a series connection, and the switching element SW2 of the upper arm and the switching element SW4 of the lower arm are connected with each other in a series connection. According to the present embodiment, a Metal-Oxide Semiconductor Field-Effect Transistor (MOSFET) is used as the switching element. Each of the switching elements SW1 to SW4 is connected such that a current flows from a low voltage side to a high voltage side through a parasitic diode of the MOSFET.

A power voltage Vb is applied to the high-voltage line LH of the H-bridge circuit 30. The low-voltage line LL of the H-bridge circuit 30 is connected with a ground through a shunt resistor 71.

A first node N1 that is an intermediate point between the switching element SW1 and the switching element SW3 is connected with a first motor terminal 81 of the motor 8, and a second node N2 that is an intermediate point between the switching element SW2 and the switching element SW4 is connected with a second motor terminal 82 of the other end of the motor 8. A current path connecting the first node N1 with the second node N2 through the motor 8 is referred to as an energization line LP.

When a current of a direction from the first node N1 toward the second node N2 flows through the motor 8, the motor 8 rotates in the positive rotation direction. When a current of a direction from the second node N2 toward the first node N1 flows through the motor 8, the motor 8 rotates in the negative rotation direction. A current direction from the first node N1 toward the second node N2 is referred to as the positive rotation direction, and a current direction from the second node N2 toward the first node N1 is referred to as the negative rotation direction.

A circuit that is constituted by the switching element SW1 and the switching element SW4 which are arranged on a diagonal line of the H-bridge circuit 30 is referred to as a first driving circuit 31, and a circuit that is constituted by the switching element SW2 and the switching element SW3 which are arranged on the other diagonal line of the H-bridge circuit 30 is referred to as a second driving circuit 32. The first driving circuit 31 and the second driving circuit 32 is pulse-width-modulation (PWM) driven by a gate signal from a switching-element driving circuit 23. Therefore, the H-bridge circuit 30 can convert the direct-current power inputted from the battery 15 and supply the converted power to the motor 8.

When the first driving circuit 31 is turned on and a power operation that the current flows from the high-voltage line LH to the low-voltage line LL is executed, the current flows through the switching element SW1 and the switching element SW4 in the positive rotation direction. When the first driving circuit 31 is turned on and a regeneration operation that the current flows from the low-voltage line LL to the high-voltage line LH is executed, the current flows through the switching element SW4 and the switching element SW1 in the negative rotation direction.

When the second driving circuit 32 is turned on and the power operation is executed, the current flows through the switching element SW2 and the switching element SW3 in the negative rotation direction. When the second driving circuit 32 is turned on and the regeneration operation is executed, the current flows through the switching element SW3 and the switching element SW2 in the positive rotation direction.

The motor-current detection circuit 70 detects a voltage between two ends of the shunt resistor 71. Hereafter, the voltage between the ends of the shunt resistor 71 that is a voltage between two ends of a differential amplifier 72 is referred to as a shunt voltage. According to the present embodiment, the shunt resistor 71 is connected in a series connection between the low-voltage line LL of the H-bridge circuit 30 and the ground. When a power operation that the current flows from the H-bridge circuit 30 to the ground is executed, the shunt voltage is positive. When a regeneration operation that the current flows from the ground to the H-bridge circuit 30 is executed, the shunt voltage is negative. The differential amplifier 72 amplifies the shunt voltage, and outputs an amplified voltage of the shunt voltage to a sample hold circuit 24 of the control and calculation portion 20.

According to the present embodiment, the differential amplifier 72 does not set an offset of an output. When the shunt voltage is 0V, the differential amplifier 72 outputs 0V. When the shunt voltage is negative, the differential amplifier 72 always outputs 0V. Therefore, an information that the shunt voltage is negative is not used in a calculation. Instead, within an output range of the differential amplifier 72 (e.g., 0V to +5V), the differential amplifier 72 sets a gain so as to output the shunt voltage that is positive at a condition that a resolution is as high as possible.

The control and calculation portion 20 includes a target-current setting unit 21, a duty calculation unit 22, the switching-element driving circuit 23, the sample hold circuit (S/H circuit) 24, a motor-current calculation circuit 25, and an abnormality determination unit 26.

The target-current setting unit 21 sets a target current value energizing the motor 8, based on the torque signal trq from the torque sensor 95 (refer to FIG. 2).

The duty calculation unit 22 calculates a duty of a PWM output signal by a proportionate integration calculation, so as to control a difference between the target current value and a value of the current returned from the motor-current calculation circuit 25 to be zero. The duty calculation unit 22 outputs a duty signal that is calculated to the switching-element driving circuit 23. Further, the duty calculation unit 22 outputs the duty signal to the sample hold circuit 24, the motor-current calculation circuit 25, and the abnormality determination unit 26, as a timing information of a PWM output.

The switching-element driving circuit 23 outputs the PWM output signal to the first driving circuit 31 of the H-bridge circuit 30 and the second driving circuit 32 of the H-bridge circuit 30, based on the duty that is calculated by the duty calculation unit 22, so as to PWM drive the first driving circuit 31 and the second driving circuit 32.

The target-current setting unit 21, the duty calculation unit 22, and the switching-element driving circuit 23 have the same configuration as those in Japanese Patent No. 4382278.

The sample hold circuit 24 executes a sample hold of an output of the motor-current detection circuit 70 at every half period, according to a PWM output timing of the switching-element driving circuit 23. In this case, the half period is as the same as that disclosed in Japanese Patent No. 4382768. The PWM output timing is a timing of the PWM output.

Hereafter, the output of the motor-current detection circuit 70 which is obtained when the first driving circuit 31 is turned on is referred to as a first signal IM1, and the output of the motor-current detection circuit 70 which is obtained when the second driving circuit 32 is turned on is referred to as a second signal IM2. The sample hold circuit 24 converts the output of the motor-current detection circuit 70 in an A/D conversion after the sample hold at every half period, and outputs the first signal IM1 and the second signal IM2 to the motor-current calculation circuit 25.

The motor-current calculation circuit 25 selects a signal that is larger between the first signal IM1 and the second signal IM2 as a selection signal IMS, and calculates a value of the selection signal IMS as an absolute value of the a motor current. In this case, the motor current is a current flowing through the motor 8. The motor-current calculation circuit 25 determines the current direction based on a relation between the selection signal IMS and the PWM output signal at a sample timing that the selection signal IMS is obtained.

When a state that at least one of the first signal IM1 or the second signal IM2 exceeds a determination threshold α that is predetermined has been continued for a time period that is greater than or equal to a predetermined time period, the abnormality determination unit 26 determines that at least one of the switching elements of the H-bridge circuit 30 is abnormal.

Next, referring to FIGS. 3A to 5D, effects of the motor controller 10 of when the H-bridge circuit 30 is normal will be described. Operation states shown in FIGS. 3A to 5D are divided by a reference that is an on-duty of the first driving circuit 31. In this case, the on-duty of the first driving circuit 31 is a duty of the first driving circuit 31 that is turned on. FIGS. 3A to 5D show, (a) driving signals of the first driving circuit 31 and the second driving circuit 32 (PWM output signals), (b) the motor currents, (c) the shunt voltages, (d) differential amplifier outputs, in this order from an upper side.

In addition, strictly speaking, regarding each of (a) the driving signals, a dead time preventing a through current is provided between an on period of the first driving circuit 31 and an on period of the second driving circuit 32. As shown in FIGS. 3A to 5D, the dead times are omitted.

A time period where the first driving circuit 31 is turned on is referred to as an interval M1, and a time period where the second driving circuit 32 is turned on is referred to as an interval M2. A sum of the interval M1 and the interval M2 is equivalent to a period T of the PWM output signal. Therefore, a time period from a center point of the interval M1 to a center point of the interval M2 is equivalent to the half period (=T/2) of the PWM output signal. The sample hold circuit 24 obtains the differential amplifier output (executes the sample hold) at every half period.

The first signal IM1 that is the differential amplifier output obtained in the interval M1 is indicated by a mark "O", and the second signal IM2 that is the differential amplifier output obtained in the interval M2 is indicated by a mark "square". The motor-current calculation circuit 25 selects the signal that is larger between the first signal IM1 and the second signal IM2 as the selection signal IMS. Since one of the value of the first signal IM1 and the value of the second signal IM2 is greater than or equal to zero and the other one of the value of the first signal IM1 and the value of the second signal IM2 is less than or equal to zero, the value of the selection signal IMS is always greater than or equal to zero. In the drawings, the mark of the selection signal IMS is indicated by a solid-line mark, and the mark of a signal that is not selected is indicated by a dashed-line mark.

Hereafter, in a description of the effects of the motor controller 10 with reference to FIGS. 3A to 5D, time charts and current-path diagrams shown in FIGS. 2 to 8 in Japanese Patent No. 4382768 will be incorporated by reference. In this case, an interval M0 in Japanese Patent No. 4382768 is equivalent to the interval M2 of the present embodiment.

FIGS. 3A to 3D show a driving state of the PWM output of when the on-duty of the first driving circuit 31 is equal to 50%, and is equivalent to FIG. 2 in Japanese Patent No. 4382768. In the driving state, the duty of the first driving circuit 31 and the duty of the second driving circuit 32 are both 50%. In this case, since the current in the positive rotation direction and the current in the negative rotation direction cancel each other, an average current flowing through the motor 8 is 0 A. In addition, since the motor 8 has a time constant that is sufficiently long relative to a period (e.g., 50 μs) of a PWM driving, the motor current hardly flows. As shown in FIGS. 3A to 3D, the mark "O" and the mark "square" are indicated by dashed-line marks.

FIGS. 4A to 4D show a driving state of the PWM output of when the on-duty of the first driving circuit 31 is larger than 50%, and is equivalent to FIG. 6 in Japanese Patent No. 4382768. In the above driving state, the interval M1 is longer than the interval M2, and the motor current flows in the interval M1 as shown in FIG. 8 in Japanese Patent No. 4382768 and flows in the interval M2 as shown in FIG. 7 in Japanese Patent No. 4382768. In other words, a direction of the average current flowing through the motor 8 is the positive rotation direction from the first node N1 toward the second node N2.

Since the output of the differential amplifier 72 is positive in the interval M1 and is zero in the interval M2, the value of the first signal IM1 is larger than the value of the second signal IM2 which are obtained by the sample hold circuit 24. Therefore, the motor-current calculation circuit 25 selects the first signal IM1 as the selection signal IMS.

The motor-current calculation circuit 25 calculates the value of the first signal IM1 that is the selection signal IMS as the absolute value of the motor current. The motor-current calculation circuit 25 determines the current direction based on a relation between the first signal IM1 and the PWM output signal in the interval M1 that is a sample timing that the selection signal IMS is obtained, that is, the motor-current calculation circuit 25 determines that current direction based on a relation between the first signal IM1 and a signal turning on the first driving circuit 31. In other words, when the first signal IM1 is selected at a timing that the first driving circuit 31 is turned on, the current direction is determined to be the positive rotation direction from the first node N1 toward the second node N2.

FIGS. 5A to 5D show a driving state of the PWM output of when the on-duty of the first driving circuit 31 is smaller than 50%, and is equivalent to FIG. 3 in Japanese Patent No. 4382768. In the above driving state, the interval M2 is longer than the interval M1, and the motor current flows in the interval M2 as shown in FIG. 4 in Japanese Patent No. 4382768 and flows in the interval M1 as shown in FIG. 5 in Japanese Patent No. 4382768. In other words, the direction of the average current flowing through the motor 8 is the negative rotation direction from the second node N2 toward the first node N1.

Since the output of the differential amplifier 72 is zero in the interval M1 and is positive in the interval M2, the value of the second signal IM2 is larger than the value of the first signal IM1 which are obtained by the sample hold circuit 24. Therefore, the motor-current calculation circuit 25 selects the second signal IM2 as the selection signal IMS.

The motor-current calculation circuit 25 calculates the value of the second signal IM2 that is the selection signal IMS as the absolute value of the motor current. The motor-current calculation circuit 25 determines the current direction based on a relation between the second signal IM2 and the PWM output signal in the interval M2 that is a sample timing that the second signal IM2 is obtained, that is, the motor-current calculation circuit 25 determines that current direction based on a relation between the second signal IM2 and a signal turning on the second driving circuit 32. In other words, when the second signal is selected at a timing that the second driving circuit 32 is turned on, the current direction is determined to be the negative rotation direction from the second node N2 toward the first node N1.

As the above description, the motor-current calculation circuit 25 according to the present embodiment selects the signal that is larger between the first signal IM1 and the second signal IM2 which are outputted by the sample hold circuit 24 at every half period of the PWM output timing, as the selection signal IMS. The motor-current calculation circuit 25 calculates the absolute value of the current and determines the current direction, based on an information of the selection signal IMS.

In the motor controller 10 according to the present embodiment, regarding the PWM output signal of the switching-element driving circuit 23, when the on-duty of the first driving circuit 31 is 100% and the on-duty of the second driving circuit 32 is 0%, the first signal IM1 is detected, and the second signal IM2 is substantially not detected. In this case, the motor-current calculation circuit 25 determines that the value of the second signal IM2 is zero, calculates the absolute value of the motor current based on the first signal IM1 as the selection signal IMS, and determines the current direction. Therefore, even though the duty is 100% or 0% where the current direction cannot be detected in a conventional technology in Japanese Patent No. 4382768, the current direction can be detected.

In a technology in Japanese Patent No. 4382768, since an output of a motor-current detection circuit is positive or negative, it is necessary to offset an output of a differential amplifier corresponding to a current that is zero to a positive side. For example, when the output range of the differential amplifier is from 0V to +5V, the output of when a current flowing through a shunt resistor is zero is set to +2.5V, the output of when the current is negative is set to 0 to +2.5V, and the output of when the current is positive is set to +2.5V to +5V. Therefore, a resolution relative to the current in a positive region is substantially cut by half.

In contrast, since the motor-current calculation circuit 25 according to the present embodiment uses zero or a positive signal between the first signal IM1 and the second signal IM2 without using a negative signal, it is unnecessary that the output of the motor-current detection circuit 70 of when a voltage is zero is offset to a positive side. Therefore, the output range of the differential amplifier 72 is efficiently used, and the output with a high resolution can be obtained.

In a third embodiment in Japanese Patent No. 4382768, it is necessary to provide an inverting amplifier. According to Japanese Patent No. 4227147, two shunt resistors and two current detection circuits associated with the shunt resistors, respectively, are provided, and a current direction is detected based on the current detected by the current detection circuits. In the above technologies, a circuit scale may increase.

In contrast, according to the present embodiment, since it is unnecessary to provide the inverting amplifier and two current detection circuits, the absolute value of the motor current and the current direction of the motor current can be detected by a simple configuration. Therefore, the present embodiment is efficient to the electric power steering device in which a limit of an attachment space is strict.

Next, referring to FIGS. 6A to 6D, effects of the motor controller 10 of when the H-bridge circuit 30 is abnormal will be described. As shown in FIGS. 6A to 6D, it is assumed that the switching element SW4 of the lower arm of the first driving circuit 31 has a short circuit failure at a time point tx in a driving state of the PWM output of when the on-duty of the first driving circuit 31 is larger than 50% in FIGS. 4A to 4D.

In this case, in the interval M2 after the time point tx, even though the switching element SW4 should be turned off, the switching element SW4 is continuously in an on state. Then, when the switching element SW2 of the upper arm of the second driving circuit 32 is turned on, the high-voltage line LH and the low-voltage line LL have a short circuit failure through the switching element SW2 and the switching element SW4, and a current that is excessive flows through the shunt resistor 71. Therefore, in the interval M2, the motor current does not flow, and the shunt voltage and the differential amplifier output become excessive.

Thus, in the interval M2, the differential amplifier output exceeds the determination threshold α (refer to a triangle mark). In this case, the determination threshold α is set to be variable according to an output characteristic of the differential amplifier 72.

When a state that at least one of the first signal IM1 or the second signal IM2 exceeds the determination threshold α that is predetermined has been continued for a time period that is greater than or equal to a predetermined time period, the abnormality determination unit 26 determines that at least one of the switching elements of the H-bridge circuit 30 is abnormal. An abnormality of the switching element is not limited to the short circuit failure of the switching element of the lower arm shown in FIGS. 6A to 6D. The abnormality of the switching element also includes a short circuit failure of the switching element of the upper arm.

According to the present embodiment, the motor controller 10 can detect an abnormality of the H-bridge circuit 30 with a simple configuration by the abnormality determination unit 26 by using the first signal IM1 and the second signal IM2.

When the motor controller 10 determines that the H-bridge circuit 30 is abnormal by the abnormality determination unit 26, the control and calculation portion 20 terminates a driving of the motor 8, and warns the driver of the abnormality by a warning lamp. Therefore, a fuel safe can be properly executed.

Other Embodiment (a) As the switching elements SW1 to SW4 constituting the H-bridge circuit 30, a transistor such as an IGBT, or a field-effect transistor other than a MOSFET may be used.

(b) The shunt resistor 71 may be connected in a series connection between a power line and the high-voltage line LH of the H-bridge circuit 30, without being connected between the low-voltage line LL of the H-bridge circuit 30 and the ground.

(c) A detailed circuit configuration of the control and calculation portion 20 is not limited to that shown in FIG. 1, and a configuration which can achieve the same functions may be used.

(d) The motor controlled according to the present disclosure is not limited to the electric power steering device, and the present disclosure may be applied to any motors for any uses.

The present disclosure is not limited to the embodiment mentioned above, and can be applied to various embodiments within the spirit and scope of the present disclosure.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A motor controller controlling an energization and a rotation direction of a DC motor that can rotate in a positive rotation direction and a negative rotation direction, the motor controller comprising:
   an H-bridge circuit including four switching elements which are connected in a bridge connection, the H-bridge circuit supplying a direct-current power to the DC motor;
   a switching-element driving circuit PWM driving a first driving circuit and a second driving circuit, wherein the first driving circuit includes the switching elements arranged on a diagonal line of the H-bridge circuit, and the second driving circuit includes the switching elements arranged on the other diagonal line of the H-bridge circuit;
   a motor-current detection circuit including a shunt resistor connected with the H-bridge circuit in a series connection, the motor-current detection circuit detecting a voltage between two ends of the shunt resistor;
   a sample hold circuit executing a sample hold of an output of the motor-current detection circuit at every half period and outputting the output of the motor-current detection circuit obtained when the first driving circuit is turned on as a first signal and the output of the motor-current detection circuit obtained when the second driving circuit is turned on as a second signal, according to a PWM output timing of the switching-element driving circuit; and
   a motor-current calculation circuit selecting a signal that is larger between the first signal and the second signal as a selection signal, the motor-current calculation circuit calculating a value of the selection signal as an absolute value of a motor current, the motor-current calculation circuit determining a current direction based on a relation between the selection signal and a PWM output signal at a sample timing that the selection signal is obtained.

2. The motor controller according to claim 1, further comprising:
   an abnormality determination unit determining that at least one of the switching elements of the H-bridge circuit is abnormal, when a state that at least one of the first signal or the second signal exceeds a determination threshold that is predetermined has been continued for a time period that is greater than or equal to a predetermined time period.

3. The motor controller according to claim 2, wherein
the motor-current detection circuit includes a differential amplifier amplifying and outputting the voltage between the two ends of the shunt resistor, and
the determination threshold that is predetermined is set to be variable according to an output characteristic of the differential amplifier.

4. An electric power steering device comprising:
the motor controller according to claim 1; and
a DC motor driven by the motor controller, the DC motor generating an assist torque to support a steering of a driver.

\* \* \* \* \*